(12) United States Patent
Hecker et al.

(10) Patent No.: US 12,157,183 B2
(45) Date of Patent: Dec. 3, 2024

(54) METHODS AND DEVICES FOR MONITORING A WELDING PROCESS FOR WELDING GLASS WORKPIECES

(71) Applicant: TRUMPF Laser- und Systemtechnik GmbH, Ditzingen (DE)

(72) Inventors: Sebastian Hecker, Aichhalden (DE); Tim Hesse, Ditzingen (DE); Michael Scharun, Schramberg (DE); Manuel Schindler, Empfingen (DE); Kristian Alber, Oberndorf (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 225 days.

(21) Appl. No.: 17/318,598

(22) Filed: May 12, 2021

(65) Prior Publication Data
US 2021/0260698 A1    Aug. 26, 2021

Related U.S. Application Data

(63) Continuation of application No. PCT/EP2019/081051, filed on Nov. 12, 2019.

(30) Foreign Application Priority Data

Nov. 13, 2018    (DE) .......................... 102018128377.6

(51) Int. Cl.
*B23K 26/26*    (2014.01)
*B23K 26/03*    (2006.01)
(Continued)

(52) U.S. Cl.
CPC .............. *B23K 26/26* (2013.01); *B23K 26/03* (2013.01); *B23K 26/0622* (2015.10);
(Continued)

(58) Field of Classification Search
CPC .. B23K 26/26; B23K 26/0624; B23K 26/705; B23K 26/0643; B23K 26/0648;
(Continued)

(56) References Cited

U.S. PATENT DOCUMENTS 5,272,312 A * 12/1993 Jurca .................... B23K 26/032
219/121.63
6,060,685 A *  5/2000 Chou .................... B23K 26/032
219/121.64
(Continued)

FOREIGN PATENT DOCUMENTS

CN          201015816 Y      2/2008
CN          101553339 A     10/2009
(Continued)

OTHER PUBLICATIONS

Machine English Translation of JP-2010279994-A (Year: 2010).*
(Continued)

*Primary Examiner* — Janie M Loeppke
*Assistant Examiner* — Erwin J Wunderlich
(74) *Attorney, Agent, or Firm* — Fish & Richardson P.C.

(57) ABSTRACT

The present disclosure relates to methods and systems for monitoring a welding process for welding at least one glass workpiece to another workpiece, e.g., also made of glass, wherein a weld seam is formed in the workpieces in a process zone that is exposed to a pulsed processing beam, e.g., to a pulsed laser beam, such as an ultra-short-pulse laser beam, wherein the radiation emitted by the process zone is detected in a time-resolved manner.

12 Claims, 4 Drawing Sheets

(51) Int. Cl.
  *B23K 26/06* (2014.01)
  *B23K 26/0622* (2014.01)
  *B23K 26/067* (2006.01)
  *B23K 26/244* (2014.01)
  *B23K 26/32* (2014.01)
  *B23K 26/324* (2014.01)
  *B23K 26/70* (2014.01)
  *B23K 31/12* (2006.01)
  *B23K 103/00* (2006.01)

(52) U.S. Cl.
  CPC ...... *B23K 26/0624* (2015.10); *B23K 26/0643* (2013.01); *B23K 26/0648* (2013.01); *B23K 26/067* (2013.01); *B23K 26/244* (2015.10); *B23K 26/32* (2013.01); *B23K 26/324* (2013.01); *B23K 26/705* (2015.10); *B23K 31/12* (2013.01); *B23K 31/125* (2013.01); *B23K 26/032* (2013.01); *B23K 2103/54* (2018.08)

(58) Field of Classification Search
  CPC .. B23K 26/067; B23K 2103/54; B23K 26/32; B23K 26/324; B23K 26/03; B23K 26/0622; B23K 26/244; B23K 31/12; B23K 31/125; B23K 26/032
  USPC ................................................ 219/121.64
  See application file for complete search history.

(56) References Cited

U.S. PATENT DOCUMENTS

| | | | | |
|---|---|---|---|---|
| 6,326,589 | B1* | 12/2001 | Beersiek | B23K 26/1423 219/121.63 |
| 6,670,574 | B1* | 12/2003 | Bates | B23K 26/032 219/121.64 |
| 7,343,218 | B2* | 3/2008 | Caldwell | B29C 66/41 219/121.6 |
| 8,497,931 | B2 | 7/2013 | Ohki | |
| 8,563,893 | B2* | 10/2013 | Kuno | B23K 26/0617 219/121.81 |
| 8,890,023 | B2* | 11/2014 | Dorsch | B23K 31/125 219/121.64 |
| 9,089,926 | B2 | 7/2015 | Pfitzner et al. | |
| 9,138,913 | B2 | 9/2015 | Arai et al. | |
| 9,501,821 | B2 | 11/2016 | Pfitzner et al. | |
| 9,776,280 | B2 | 10/2017 | Ogura et al. | |
| 10,632,570 | B2* | 4/2020 | Oowaki | B23K 31/12 |
| 10,702,948 | B2* | 7/2020 | Ortner | B23K 26/0648 |
| 11,229,973 | B2* | 1/2022 | Haug | B23K 26/032 |
| 11,878,365 | B2* | 1/2024 | Dicken | B23K 26/04 |
| 2002/0158053 | A1 | 10/2002 | Kessler et al. | |
| 2004/0200067 | A1* | 10/2004 | Ogura | B23K 26/0624 29/846 |
| 2006/0278113 | A1* | 12/2006 | Kawagoe | B29C 66/836 101/494 |
| 2009/0206065 | A1* | 8/2009 | Kruth | B29C 64/393 219/121.65 |
| 2010/0025387 | A1 | 2/2010 | Arai et al. | |
| 2011/0139760 | A1* | 6/2011 | Shah | H01S 3/0014 219/121.6 |
| 2012/0285936 | A1* | 11/2012 | Urashima | G01B 9/02091 219/121.63 |
| 2013/0344302 | A1* | 12/2013 | Helie | B23K 26/57 156/272.8 |
| 2014/0175071 | A1 | 6/2014 | Pfitzner et al. | |
| 2014/0231021 | A1* | 8/2014 | Liu | B23K 26/0624 219/121.64 |
| 2015/0027168 | A1 | 1/2015 | Dabich et al. | |
| 2015/0075700 | A1* | 3/2015 | Kawagishi | B29C 66/9592 156/64 |
| 2017/0095885 | A1 | 4/2017 | Zhang et al. | |
| 2019/0022793 | A1* | 1/2019 | Haug | B23K 31/125 |
| 2021/0260700 | A1 | 8/2021 | Hecker et al. | |

FOREIGN PATENT DOCUMENTS

| | | | | |
|---|---|---|---|---|
| CN | 101965242 | A | | 2/2011 |
| CN | 103100792 | A | | 5/2013 |
| CN | 103857490 | A | | 6/2014 |
| DE | 10222786 | A1 | | 11/2003 |
| DE | 102004036576 | A1 | | 3/2006 |
| EP | 0911109 | | | 9/2003 |
| EP | 2543464 | A2 * | 1/2013 | ........... B23K 26/032 |
| EP | 2915785 | | | 9/2015 |
| JP | 2010279994 | A * | 12/2010 | |
| JP | 2016097412 | A | | 5/2016 |
| KR | 20120039212 | | | 4/2012 |
| WO | WO 2008/052591 | | | 5/2008 |
| WO | WO 2013/000622 | | | 1/2013 |
| WO | WO 2017/157856 | | | 9/2017 |
| WO | WO 2020/099420 | | | 5/2020 |
| WO | WO 2020/099421 | | | 5/2020 |

OTHER PUBLICATIONS

Cvecek et al., "Gas bubble formation in fused silica generated by ultra-short laser pulses," Jun. 20, 2014, Optical Society of America (Year: 2014).*
KR Office Action in Korean Appln. No. 10-2021-7018103, dated Nov. 24, 2022, 9 pages (with English translation).
CN Office Action in Chinese Appln. No. 201980074784.3, dated Aug. 1, 2022, 16 pages (with English translation).
CN Office Action in Chinese Appln. No. 201980074783.9, dated Aug. 12, 2022, 12 pages (with English translation).
Beersiek, "A CMOS camera as a tool for process analysis not only for laser beam welding," from URL <http://www.lessmueller.de/en/visualization>, Jul. 30, 2015, 1 page.
Cvecek et al., "Analysis of shockwave formation in glass welding by ultra-short pulses, " Procedia CIRP, Jan. 1, 2018, 74:339-43.
Cvecek et al., "Defect formation in glass welding by means of ultra-short laser pulses," Physics Procedia, Jan. 1, 2010, 5:495-502.
Muller, "Process monitoring in laser beam welding by evaluating the reflected power," University of Stuttgart, 2002, 254 (with English translation).
PCT International Search Report and Written Opinion in International Appln. No. PCT/EP2019/081051, dated Mar. 24, 2020, 10 pages (with English translation).
PCT International Search Report and Written Opinion in International Appln. No. PCT/EP2019/081049, dated Mar. 25, 2020, 10 pages (with English translation).
Richter, "Direct laser bonding of transparent Materials using ultra-short laser pulses at high repetition rates," Friedrich-Schiller-Universität Jena, Dissertation, Mar. 6, 2014.
KR Office Action in Korean Appln. No. 10-2021-7018103, dated May 24, 2023, 11 pages (with English translation).
DE Office Action in German Appln. No. 102018128377.6, mailed on Jun. 16, 2023, 12 pages (with English translation).
CN Office Action in Chinese Appln. No. 201980074783.9, mailed on Aug. 3, 2022, 14 pages (with English translation).
CN Office Action in Chinese Appln. No. 201980074783.9, mailed on Jul. 22, 2023, 15 pages (with English translation).
EP Office Action in European Appln. No. 19808961.7, mailed on Nov. 3, 2023, 12 pages (with English translation).
EP Office action in European Appln. No. 19808962.5, mailed on Nov. 6, 2023, 12 pages (with English translation).
Hecker, "Process monitoring during glass welding, invention submission," Ediologic Portal, submitted Mar. 2, 2018, 12 pages (with English translation).
CN Office Action in Chinese Appln. No. 201980074783.9, mailed on Mar. 22, 2023, 7 pages (English translation).
US Non-Final Office Action in U.S. Appl. No. 17/318,263, mailed on Apr. 1, 2024, 17 pages.

* cited by examiner

METHODS AND DEVICES FOR MONITORING A WELDING PROCESS FOR WELDING GLASS WORKPIECES

CROSS REFERENCE TO RELATED APPLICATIONS

This application is a continuation of and claims priority under 35 U.S.C. § 120 from PCT Application No. PCT/EP2019/081051, filed on Nov. 12, 2019, which claims priority from German Application No. 10 2018 128 377.6, filed on Nov. 13, 2018. The entire contents of each of these priority applications are incorporated herein by reference.

TECHNICAL FIELD

The present disclosure relates to methods and devices for monitoring a welding process for welding at least one glass workpiece to a further workpiece, e.g., also made of glass, wherein the monitoring may serve, for example, for detecting and identifying cracks and/or interruptions of seams and/or errors in weld seams in glass workpieces during laser welding.

BACKGROUND

In laser welding of glass workpieces, the laser welding process has been set up manually to date. Quality control of the workpieces welded together by the laser welding process and of the weld seam itself has also been carried out manually to date.

In this regard, the quality control was performed by means of a microscope through microscopic examinations of the weld seams and of the other areas of the joined workpieces after completion of the actual welding process, both in top view and by inspection of transverse sections.

On this basis, the laser welding process was then optimized iteratively. This approach for optimizing the welding process requires a correspondingly high amount of manual work and is material- and time-intensive, since quality control for the respective parameter set of the laser welding process can only be performed on the microscope after completion of the respective welding process and outside the welding device.

In laser welding of metals, it is known to monitor the radiation emitted from the respective process zone, into which the focus of the laser is placed, with an image sensor and to derive insights about the welding process therefrom.

Such a method for laser welding of opaque materials is, for example, known from WO 2008/052591A1. In this method, the radiation emitted from a working region is sensed by a detector system, wherein the radiation emitted from the working region is sensed simultaneously at least two wavelengths so as to obtain more detailed information of the processes happening in the welding process.

SUMMARY

The present disclosure provides methods and devices for monitoring a welding process for welding at least one glass workpiece to a further workpiece, e.g., also made of glass, which allow for improved monitoring of the welding process.

In one aspect, this disclosure provides methods for monitoring a welding process for welding at least one glass workpiece to a further workpiece, for example, also made of glass, wherein a weld seam is formed in the workpieces, in a process zone that is exposed to a pulsed processing beam, e.g., to a pulsed laser beam, such as an ultra-short-pulse laser beam. According to the disclosure, the radiation emitted by the process zone is detected in a time-resolved manner.

In certain embodiments, both, multiple, or all workpieces that are to be welded together are made of glass. The process zone, in which the weld seam is formed, is preferably located between the workpieces, such that the processing beam is guided to the process zone through at least one workpiece, which is transparent to the processing beam. Accordingly, at least the workpiece through which the processing beam is guided to the process zone is transparent to the processing beam. The further workpieces may also be transparent; however, may also be opaque to the processing beam.

By detecting the radiation emitted by the process zone in a time-resolved manner, it becomes possible to perform monitoring of the welding process, already during the welding process while welding glass workpieces, such that the presence and/or the formation and/or the change of cracks and/or errors and/or interrupted seams in the weld seam produced in the process zone may be detected.

Based on these insights, among other things, the welding process can be optimized already during the execution of the current welding process, thereby avoiding the need for an iterative process.

In this regard, the radiation emitted by the process zone is detected in a time-resolved manner. In this regard, the process zone effectively serves as a radiation source arranged in the glass volume of one, two, multiple or all glass workpieces.

In this regard, the electromagnetic radiation emitted by the process zone can be radiation of the processing beam reflected or scattered on or in the process zone. The electromagnetic radiation emitted by the process zone can also be heat radiation of the glass material that is heated, e.g., melted, by the processing beam.

In this regard, the methods are based on the insight that when welding glass workpieces by means of a pulsed processing beam, for example a pulsed laser beam, such as an ultra-short-pulse laser beam, non-linear absorption effects can be achieved in the glass due to the achievable high intensities in the respective beam focus. If corresponding repetition rates are used for the pulsed processing beam, the energy introduced into the process zone by means of the respective pulses accumulates, such that, due to corresponding heat accumulation effects, a local melting of the glass material occurs. This local melting results in a highly absorbing plasma, initially the size of the focus volume, close to the geometric focus of the pulsed processing beam, which plasma then forms the process zone.

On the plasma surface, which bounds the process zone, and particularly in the region of the plasma surface, which is oriented in the direction of the processing beam hitting the plasma and which the processing beam hits, however, absorption is increased. Thus, the plasma volume is able to further absorb energy on the plasma surface due to the increased absorption of the processing beam and the resulting energy input into the plasma volume, such that the volume of the plasma can continue to grow, wherein this growth of the plasma volume extends mainly directed along the processing beam and in the direction toward the beam source. In other words, the plasma can spread in an elongated shape along the processing beam. An elongated bubble, formed by the plasma, can be formed thereof.

Due to the additional energy input from the direction of the processing beam hitting the plasma, it is furthermore possible for the location and/or position of the plasma volume to change and to be displaced for example along the processing beam in the direction toward the beam source.

In this way, an absorption volume can form, which may exceed the original focus volume many times over, such that the process zone may accordingly be many times larger than the focus volume.

If, due to the plasma surface escaping the focus of the laser beam because of the volume growth, the beam intensity hitting the plasma surface is no longer sufficient for maintaining the plasma—i.e., if not enough energy can be absorbed to maintain the plasma—the expansion process of the plasma collapses and the absorption restarts in the focus of the pulsed processing beam. Accordingly, the welding process takes place periodically and each time, bubble-like regions form as plasma bubbles, which in turn result in a bubble-like melt volume. Due to the possible change of location and/or position of the plasma volume in the workpieces, a resulting melt volume may also be larger than the created plasma volume. The plasma volume can virtually pass, in a limited manner, through the workpiece volume in the direction of the processing beam and toward the beam source and in doing so, can in each case leave a melted region which in turn results in a melt volume, which has a larger expansion than the expansion of the plasma volume.

The non-linear absorption of the processing beam at the plasma can originate from the high electron temperature in the plasma. The electrons can give off energy to the atomic cores, which may lead to lattice vibrations and additional heating of the material due to heat accumulation.

Applying a relative movement of the processing beam with respect to the workpiece during the welding process, accordingly leads to a weld seam extending in the direction of movement after the previously melted material has solidified, which weld seam is present in the form of a series of bubble-like melt volumes merging into one another. The relative velocity between processing beam and workpiece used during the welding process, in this regard, is critical to the overlap of the respective bubble-like regions.

The periodic expansion and collapse of the plasma also results in a periodic change of the intensity of the radiation emitted by the process zone. The radiation emitted by the process zone can thus be subjected to a corresponding intensity fluctuation of the emitted radiation due to the periodic formation of the bubble-like regions of the plasma. These intensity fluctuations of the radiation emitted by the process zone are detected and subsequently observed in a time-resolved manner. This allows one to observe at least the amplitudes of the intensity fluctuations and the periodicity and/or the frequency of the intensity fluctuations and their change.

In certain embodiments, a localization of the respective intensity fluctuation in the workpiece and/or in the workpieces relative to a respectively predefined processing position, which is known due to the relative position between the laser beam and the workpiece, can be achieved.

In some embodiments, the intensity of the radiation emitted by the process zone can be detected, such that the progression of the intensity is thus detected over the course of time.

In other embodiments, the periodicity and/or frequency and/or the frequency spectrum of intensity fluctuations of the radiation emitted by the process zone can be detected and from that, the quality of the produced weld seam can be extrapolated. The presence of an error and/or cracks and/or interruptions of the produced weld seam can be extrapolated from significant changes and/or drops of the mentioned parameters.

In other embodiments, the radiation emitted by the process zone is captured by a sensor, e.g., a photodiode, and is converted into a signal, which can then be prepared for a subsequent evaluation. The sensor can also be formed of multiple photo diodes, each of which is particularly preferred to work at a different wavelength.

In this regard, the signal can be evaluated in terms of the presence and/or the formation, and/or the change of cracks, and/or interruptions of seams, and/or errors in the weld seam, wherein it an error output and/or a termination of the welding operation can be performed when predefined tolerance limits are exceeded. Thus, an automated evaluation in terms of predefined errors in the at least one workpiece can be achieved to thus achieve a more reliably check of the work product and a quicker optimization of the welding process.

In certain embodiments, the signal can be prepared by a filtering, and/or a noise reduction, and/or a smoothing, and/or a highlighting of special features.

In another further embodiment of the methods, the prepared signal is evaluated by means of a temporal integration over a predetermined space of time and a subsequent comparison with a current signal value, and/or by an observation over time, and/or by an observation of signal maxima and signal minima over a certain period of time, and/or by carrying out a fast Fourier transformation and an observation of changes in the frequency spectrum, and/or by calculating a mean value and a comparison with a current signal value, to detect the presence, and/or the formation, and/or the change of cracks, and/or errors, and/or interruptions of the weld seam.

In some embodiments, the radiation emitted by the process zone is screened for a frequency of the intensity fluctuations that is different from the pulse frequency of the processing beam. It has been shown that the periodicity of the radiation emitted by the process zone is essentially independent of the periodicity of the pulse processing radiation.

Moreover, an evaluation of the found errors, and/or cracks, and/or interruptions of seams can also be carried out in an automated process and a work product can be automatically rejected if it does not meet predetermined quality requirements.

In another aspect, this disclosure provides devices for monitoring a welding process for welding at least one glass workpiece to a further workpiece, e.g., also made of glass, wherein the devices include a processing objective for exposing a process zone of at least one of the workpieces to a pulsed processing beam, e.g., to a pulsed laser beam, such as an ultra-short-pulse laser beam. According to the disclosure, a sensor for the time-resolved detection of radiation emitted by the process zone is provided.

Hence, the advantages of the methods already described above can be achieved by these new devices. In particular, the devices can be used to detect the presence and/or the formation, and/or the change of cracks, and/or errors, and/or interruptions of the weld seam formed in the process zone.

In certain embodiments, an optic for capturing the radiation emitted by the process zone and for imaging the radiation onto the sensor may be provided, wherein the optic comprises the processing objective or an imaging system separate from the processing objective.

Advantageously, a sensor exposed with the processing objective, e.g., with the interposition of a beam splitter, and/or an optical filter, and/or a focusing lens, and/or a sensor exposed with an imaging system separate from the processing objective may be provided. Thus, the region of the process zone imaged by the processing objective and the region of the process zone imaged by the separate imaging system can be viewed.

In some embodiments, the processing objective is designed and configured for focusing the processing beam in a process zone located in the glass volume formed by the at least one workpiece.

Further advantages and features of the present disclosure can be seen in the following description of certain useful embodiments. The features described therein can be implemented on their own or in combination with one or multiple of the features presented above, provided the features do not contradict each other. In this regard, the following description of preferred exemplary embodiments is given with reference to the accompanying drawing.

DESCRIPTION OF DRAWINGS

Further embodiments of the disclosure are elucidated in more detail by means of the description below.

DETAILED DESCRIPTION

In the following, embodiments are described with reference to the figures. Here, elements being equal or similar or having the same effect are provided with identical reference numbers in the different figures, and a repeated description of these elements is partly foregone to avoid redundancies.

Figure 1:
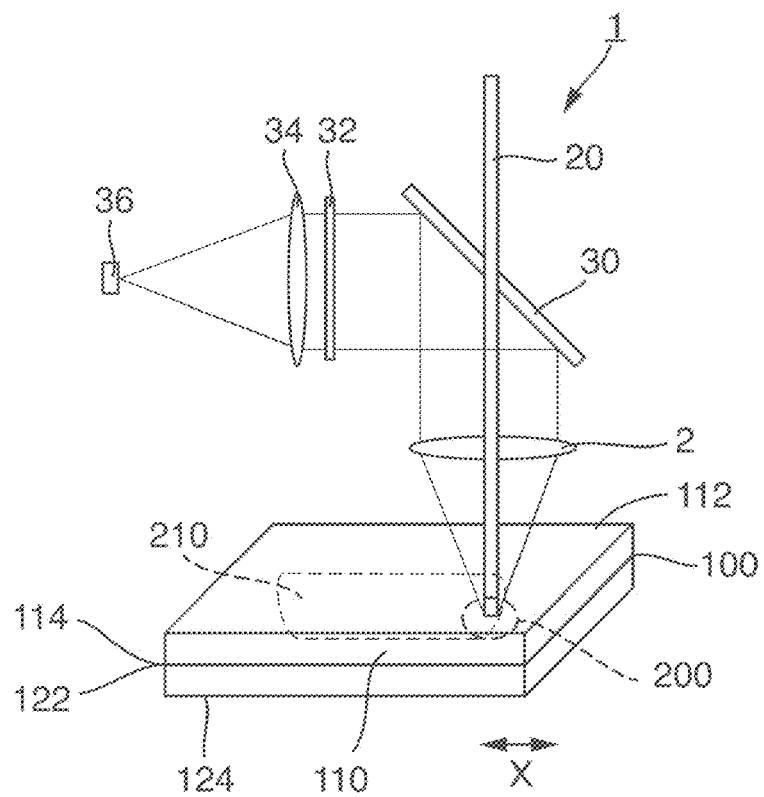
FIG. 1 is a schematic representation of a device for monitoring a laser welding process for welding glass workpieces, in which the radiation emitted by a process zone is detected through a processing objective, as described herein.

FIG. 1 schematically shows a device 1 for monitoring a welding process for welding two workpieces 110, 120.

In the embodiment shown, the workpieces 110, 120 are formed of glass—for example in the form of two glass panes—which are arranged next to each other at a common border surface 100, which is arranged between the two workpieces 110, 120, and are welded together at a section of the border surface 100. In other words, at least part of the bottom side 114 of the upper workpiece 110 shown in FIG. 1 abuts on the upper side 122 of the lower workpiece 120. Accordingly, the upper side 122 of the lower workpiece 120 and the bottom side 114 of the upper workpiece 110 together form the border surface 100, in which the welding is to be performed and/or has been performed.

The two workpieces 110 and 120 can be joined by means of optical contact bonding in the region where the border surface 100 is formed, to achieve a provisional positioning and fixation of the two workpieces 110 and 120 against one another even before welding.

Due to the nature of their material, namely glass, the two workpieces 110, 120 are substantially transparent to the pulsed processing beam 20, by means of which the two workpieces 110, 120 are to be welded. Thus, the pulsed processing beam 20, which is provided for carrying out the welding, can pass through the workpieces 110 and 120 and in particular, can also reach the border surface 100 through the upper workpiece 110. This makes welding the workpieces 110 and 120 within the workpiece volume formed by the two workpieces 110, 120 possible.

Such welding within a workpiece volume formed by at least two workpieces is not possible using materials that are opaque to a processing beam.

The lower workpiece 120, however, may also designed as being opaque for the processing beam 20. However, the processing beam 20 can still pass through the upper glass workpiece 110, which is transparent for the processing beam 20, to reach the border surface 100 located between the two workpieces 110, 120, in order to perform a welding operation there.

It is preferred to use a pulsed laser beam, e.g., an ultra-short-pulse laser beam, as the pulsed processing beam 20.

For example, a pulsed laser having wavelengths of 1030 nm or 1064 nm or 515 nm or 532 nm with pulses in the femtosecond range or picosecond range and with frequencies of the repetition rates between 100 kHz and multiple MHz can be used. The laser can also be operated in burst mode.

The device 1 comprises a processing objective 2, through which the pulsed processing beam 20 hits the workpieces 110, 120 and is focused in a process zone 200 located in one or in both workpieces 110, 120, whereby the intensity of the processing beam 20 is highest in the focus located in the process zone 200, whereas it is lower in the surrounding regions. The processing of material in the process zone 200 occurs because the high intensity of the processing beam 20 in its focus results in melting the material present in the process zone 200. Hence, it is possible to achieve, for example, the welding of two material regions, which were previously present separately in the process zone 200 and are now connected in a materially bonded manner by means of melting, during subsequent cooling.

When using a pulsed processing beam 20, e.g., when using an ultra-short-pulse laser beam, non-linear absorption effects are achieved in the glass material of the at least one workpiece 110, 120 due to the very high achievable intensities in the focus provided by the processing objective 2. When using suitable repetition rates of the pulsed processing beam 20, heat accumulation effects occur in the glass material, which leads to a local melting of the glass material in the process zone 200.

To achieve a connection of the workpieces 110 and 120, the process zone 200 is placed accordingly in the workpieces 110, 120, such that it is arranged close to the border surface 100 or includes the border surface 100 between the two workpieces. For this purpose, the processing beam 20 is prepared accordingly and focused into the process zone 200 by means of the correspondingly configured and set up processing objective 2.

The embodiment of a processing objective 2 for a processing beam 20 for processing, and in particular welding, workpieces 110 and 120 in a process zone 200 is generally known. This also applies to the use of pulsed processing beams 20, for example pulsed laser beams and/or ultra-short-pulse laser beams.

In the process zone 200, in which the focus of the processing beam 20 is located, the material of one, multiple or all workpieces 110, 120 is melted in order to then, after the previously melted material is solidified again, achieve a welding of the workpieces 110, 120 due to the melted and then solidified material. The process zone 200 may have the same expansion as the focus of the processing beam 20 or expand further.

The processing beam 20, together with the processing objective 2, is displaceable relative to the workpieces 110, 120 in a displacement direction X, in order to draw a weld seam 210 in the workpieces 110, 120. In this regard, either the workpieces 110, 120 or the processing beam 20 or even both can be displaced in opposite directions along the displacement direction X. It is also possible to carry out movements in parallel to the plane formed by the border surface 100 for drawing correspondingly more complex shapes of weld seams 210. The expansion of the weld seam 210 in the direction of movement can be determined by means of the movement of the processing beam 20 relative to the workpieces 110, 120.

In this regard, the process zone 200 is located between the two workpieces 110, 120 and encloses the border surface 100. The processing beam 20 can pass through the workpieces 110, 120 due to their transparency and subsequently makes it possible to process the process zone 200 located inside the glass volume defined by the workpieces 110, 120.

This arrangement of the process zone 200 inside the glass volume formed by the workpieces 110, 120 accordingly diametrically differs from the process zones, in which materials that are opaque for laser radiation are welded. In the case of an opaque material, for example when welding two metallic workpieces together, it is impossible for a processing beam to pass through an upper side of a first workpiece, such that it makes it possible for the bottom side of said workpiece to be welded to a second workpiece opposite the bottom side. In fact, the processing beam can then not penetrate the opaque workpiece.

Thus, a particular embodiment and set up of the processing objective 2 is advantageous for accordingly making it possible to focus the processing beam 20 into the inside of the glass volume, which is formed by the at least two workpieces 110, 120. As already mentioned, melting of the material present there, for example, of the glass material, takes place in the process zone 200. At that point in time, the process zone 200 emits electromagnetic radiation. This emission of electromagnetic radiation takes place at least while the process zone 200 is exposed to the processing beam 20—however, a kind of afterglow may also take place as long as the melted and solidifying material has an increased temperature.

In this regard, the electromagnetic radiation emitted by the process zone 200 can also be, for example, radiation of the processing beam 20 reflected or scattered on or in the process zone 200. The electromagnetic radiation emitted by the process zone 200 can also be heat radiation of the melted glass material.

The radiation emitted by the process zone 200 can be captured by means of the processing objective 2, for example, and then be imaged onto a sensor in the form of a photo diode 36 via a beam splitter 30, an optical filter element 32, and a focusing lens 34, for example. The beam splitter 30 can be designed as a dichroic mirror, for example. The optical filter element 32 can be selected, for example, for weakening the radiation decoupled by the beam splitter 30, and/or for selecting a certain wavelength range, and/or for suppressing reflected processing light.

In this regard, the sensor in the form of the photodiode 36 can be designed such that it outputs a voltage signal dependent on the radiation intensity of the radiation emitted by the process zone 200 hitting the photodiode 36. This voltage signal corresponding with the intensity of the radiation emitted by the process zone 200 is detected in a time-resolved manner, meaning over time, and is then subsequently evaluated. The behavior of the signal over time and examples of evaluations of the signal are discussed below, in particular also with reference to FIGS. 5 to 8.

Instead of the photodiode 36, it is also possible for a different, suitable detector system to be provided as a sensor, by means of which detector system a parameter of the radiation emitted by the process zone 200 can be detected over time. For example, a matrix camera can be used, which can have a spectral sensitivity that is suitable, i.e., high enough, for the temperature radiation to be measured.

A camera for radiation ranging from the visual spectral range to near-infrared to far-infrared can also be used as a detector system. For example, CCD, CMOS and/or InGaAs cameras are suitable as a camera for the image sensor, wherein this list is by no means exhaustive and further suitable types of cameras, and combinations of cameras, can be used.

Figure 2:
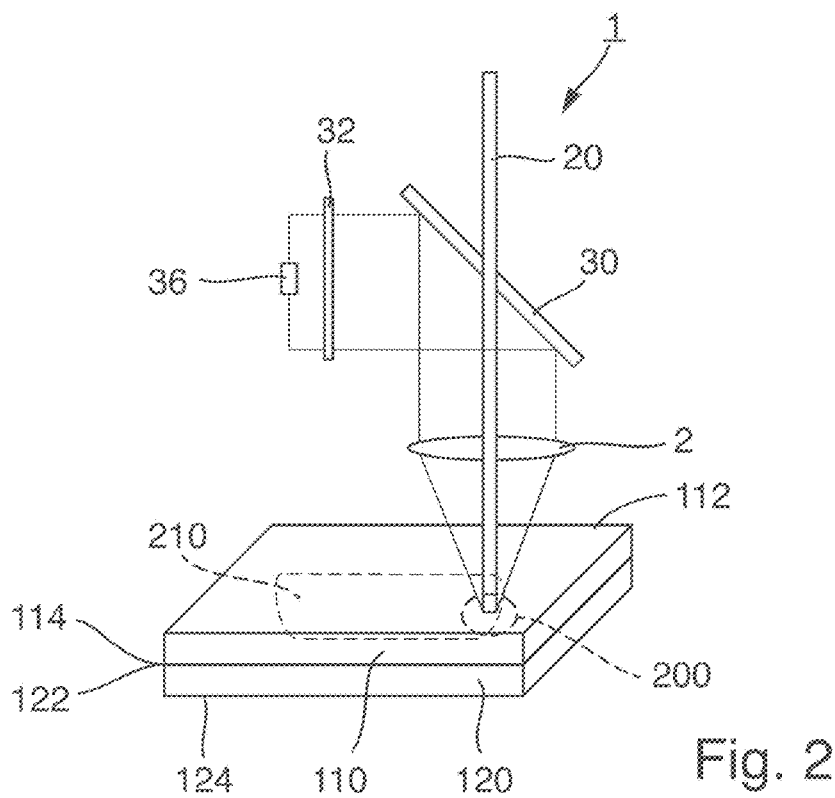
FIG. 2 is a schematic representation of a device for monitoring a laser welding process for welding glass workpieces in a second embodiment, in which the radiation emitted by a process zone is detected through a processing objective, as described herein.

FIG. 2 shows a further device 1 for monitoring a welding process and in particular, for monitoring the formation of a weld seam 210. In this regard, compared to the embodiment of FIG. 1, the focusing lens provided therein is dispensed with and accordingly, the radiation emitted by the process zone 200 is accordingly imaged onto the sensor in the form of the photodiode 36 without the focusing lens. This can lead to the intensity, which is imaged onto the photodiode 36, being lower than in the embodiment in FIG. 1. Depending on the embodiment of the photodiode 36, a present dynamic range of the photodiode 36 can thus be taken into account accordingly. In other words, by means of this embodiment, the intensity of the radiation emitted by the process zone 200 hitting the photodiode 36 can be reduced compared to an embodiment with a focusing lens.

Figure 3:
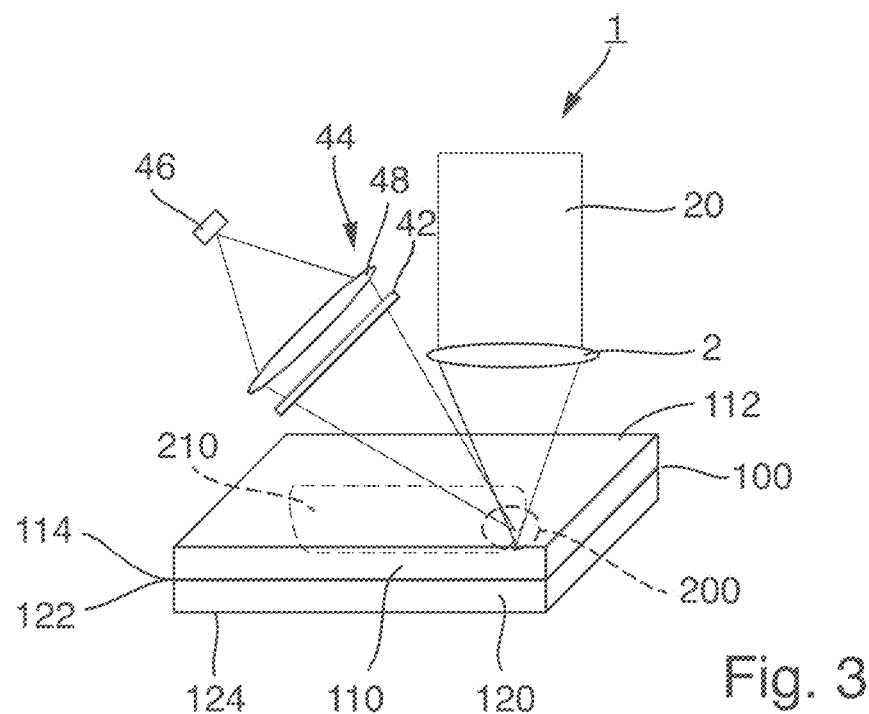
FIG. 3 is a schematic representation of a device for monitoring a laser welding process for welding glass workpieces, in which the radiation emitted by a process zone is detected by an imaging system that is separate from a processing objective, as described herein.

FIG. 3 shows a further device 1 for monitoring a welding process, in which an imaging system 44, which is constructed separately from the processing objective 2 is provided, which may, for example, have a focusing lens 48 as well as an optical filter 42. By means of the imaging system 44, which also may have a more complex structure than in the embodiment of FIG. 3, the processing zone 200 is imaged onto a sensor in the form of a photo diode 46.

Accordingly, the imaging system 44 is configured, oriented, and focused such that it images the process zone 200, which is geometrically essentially defined by the processing objective 2 and its configuration, orientation, and focusing relative to the workpieces 110, 120, onto the photodiode 46.

The separately constructed imaging system 44 with its sensor in the form of the photodiode 46 can be provided either in addition to the system described in FIGS. 1 and 2, which system includes the beam splitter 30 and the photodiode 36, or alternatively thereto.

Figure 4:
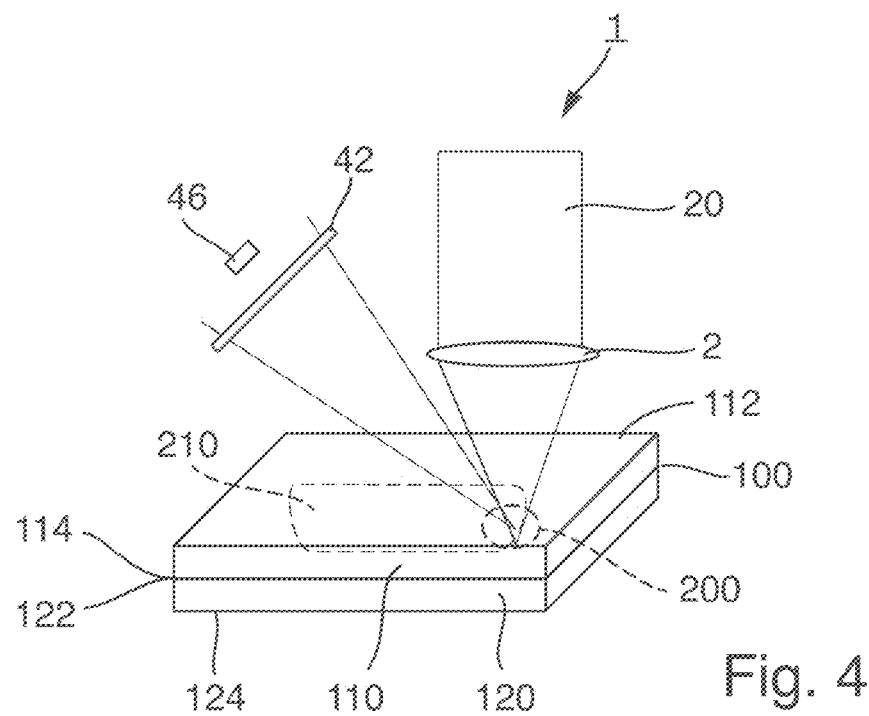
FIG. 4 is a schematic representation of a device for monitoring a laser welding process for welding glass workpieces in a further embodiment, in which the radiation emitted by a process zone is detected by an imaging system that is separate from a processing objective, as described herein.

FIG. 4 shows a further embodiment of a device 1 for monitoring a welding process and in particular, for monitoring the formation of a weld seam 210. In this regard, the radiation emitted by the process zone 200 is radiated directly onto a photodiode 46, for example via an optical filter 42. The detection of the radiation emitted by the process zone 200 is accordingly carried out without any further interposed optical imaging system. Depending on the embodiment of the photodiode 46, a present dynamic range of the photo diode 46 can thus be taken into account accordingly. In other words, by means of this embodiment, the intensity of the radiation emitted by the process zone 200 hitting the photodiode 46 can be reduced compared to an embodiment with a focusing lens.

Figure 5:
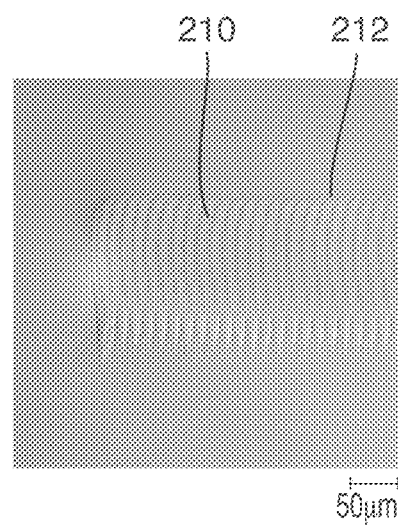
FIG. 5 is an example of a representation of a weld seam formed in in a glass workpiece by means of a pulsed processing beam, in a lateral section.

FIG. 5 shows an example of an image of a weld seam 210 in a lateral sectional view, wherein the image was captured in a laterally ground specimen using a transmitted light microscope.

In this regard, it is evident in this lateral section of the weld seam 210 that the process of the formation of the weld seam 210, which is achieved by melting the material of the first workpiece 110 and/or the second workpiece 120 and a subsequent solidification of the melted material, can be described by the formation of a plurality of periodically forming plasma bubbles.

As described above, the plasma bubbles may migrate within the respective workpiece 110, 120 essentially along the processing beam 20, such that an elongated melted region may arise as a result, which does not have to be congruent with the respectively formed plasma volume but can also be larger.

In this regard, a heating and a melting of the material present in the process zone 200 initially takes place, in the focus of the processing beam 20, such that a highly absorbing plasma forms.

At the respective plasma surface that forms, a strong absorption of the processing beam 20 occurs, such that the plasma expands accordingly, due to the strong heating in the plasma surface, in the direction of the processing beam 20, forming bubble-like regions 212 and further absorbing energy. This process has already been described above.

This expansion process is terminated when the surface of the plasma, which escapes from the focus of the processing beam 20 due to the expansion, is no longer provided, by the processing beam 20, which then is no longer focused in this region, with sufficient intensity to maintain the plasma, whereby said plasma collapses and the process of the formation of bubble-like regions 212 restarts originating from the energy introduced in the focus of the processing beam 20. The formation of bubble-like regions 212 thus occurs periodically and in each case originating from the focus of the processing beam 20. The shape of the bubble-like regions 212 is accordingly formed so as to be elongated in the direction of and along the processing beam 20.

Due to the relative movement of the workpiece 110, 120 to the processing beam 20, the bubble-like regions 212 that form become adjacent in the region of the process zone 200 then moving through the workpiece 110, 120. The speed of the relative movement is thus significant for how strongly the bubble-like regions 212 flow into one another and/or fall apart.

From FIG. 5, it is evident that the weld seam 210 is formed of a plurality of bubble-like regions 212, which string together and merge.

As the process zone 200 effectively serves as a radiation source during the processing operation, it is accordingly possible to detect, by means of the photodiode 36, the progression of a parameter of the radiation emitted by the process zone 200 and in particular to record an intensity progression over time.

Figure 6:
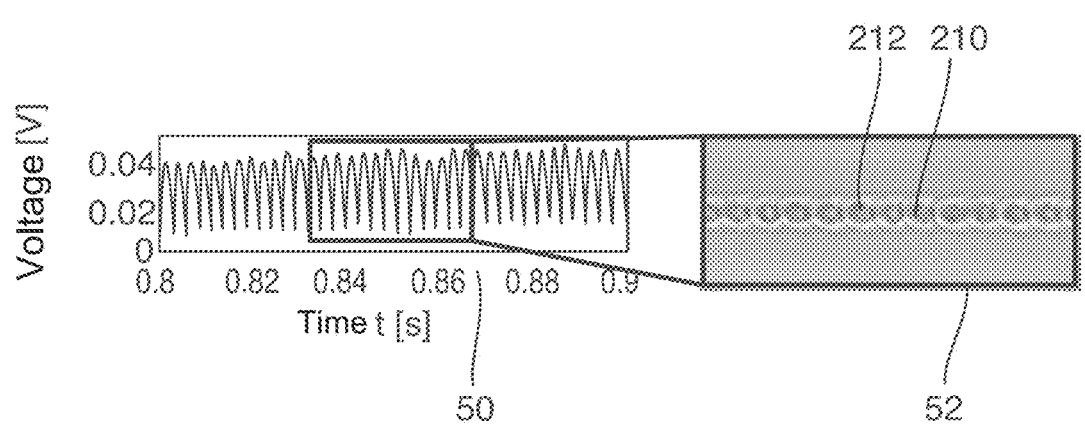
FIG. 6 is a diagram of an example of a time progression of the intensity of radiation emitted from a process zone and an image, corresponding thereto, of the weld seam actually produced in the process zone, in a top view.

FIG. 6 shows in a diagram 50 such a progression of the intensity of the radiation emitted by the process zone 200 over time (seconds). The intensity of the radiation emitted by the process zone 200 is indicated here by a voltage value, which corresponds to the voltage value output by the photodiode 36, 46, which, in turn, is characteristic for the intensity of the radiation emitted by the process zone 200 and detected by the photodiode 36, 46 over time.

FIG. 6 also shows, in a top view and virtually like viewing it through a magnifying glass, an image 52 of that section of the weld seam 210 that corresponds to the intensity progression, for a particular segment of the intensity progression shown in the diagram 50. This image was produced by means of a transmitted light microscope, wherein the focus was put in the border surface between the two workpieces 110, 120 in order to make the weld seam 210 visible. The weld seam 210 is composed, as evident in the image 52, of a plurality of bubble-like regions 212, each adjacent to one another and in each case merging with adjacent bubble-like regions.

Accordingly, both the welding process and the expansion of the process zone 200 in the glass material organize themselves. This process can substantially organize itself, dependent on the energy introduced into the glass material during the welding process, dependent on the glass material to be welded and dependent on the relative velocity between the processing beam 20 and the workpiece 110, 120.

It is evident that the frequency of the formation of the bubble-like regions 212 and the resulting intensity fluctuations are essentially independent of the pulse frequency of the pulsed processing beam used, as it is shown in FIG. 6 in the diagram 50 over time. In the embodiment shown in FIG. 6, for example, about 35 intensity cycles are visible in the 0.1 s long time period shown, which results in a frequency of about 350 Hz for the formation of the respective bubble-like regions 212.

The pulse frequency of the ultra-short-pulse laser beam used herein as a pulsed processing beam 20, on the other hand, is over 100 kHz. Accordingly, the detected frequencies of the formation of the bubble-like regions 212 and the pulse frequency of the processing beam 20 are magnitudes apart, so that here in the detected signal, a simple distinction can be made between the frequency components, which trace back to the processing beam 20, and the frequency components, which trace back to the formation of the bubble-like regions 212.

The weld seam 210 visible in a top view in the image 52 has a very uniform progression, even when examined with the eye, of the forming bubble-like regions 212, and thus a very uniform progression of the weld seam 210.

Based on the analysis of the radiation emitted by the process zone over time, it is possible to accordingly extrapolate from the uniform intensity progression and/or its uniform amplitude and/or from the uniform frequency progression of the periodic intensity fluctuations and/or the only slightly varying cycle duration of the intensity fluctuations that a high-quality weld seam 210 is formed here.

Figure 7:
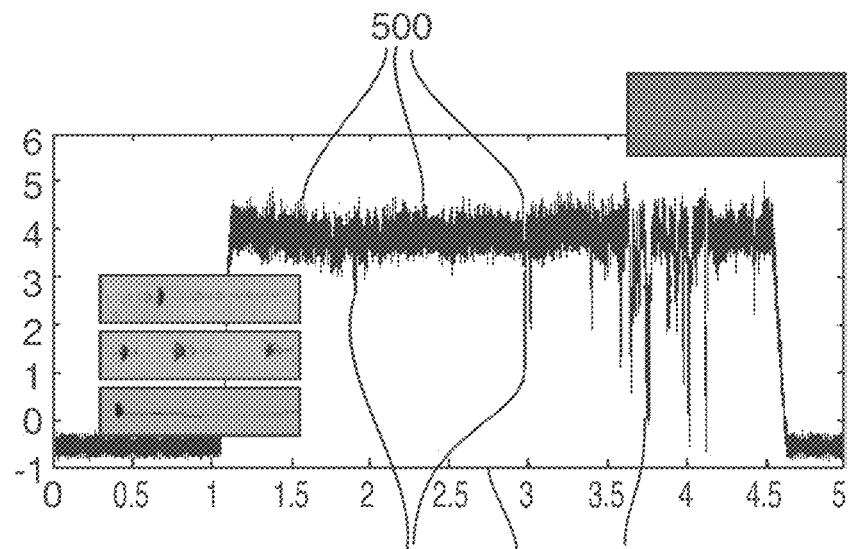
FIG. 7 is a diagram of an example of a time progression of the intensity of radiation emitted from the process zone upon occurrence of errors and cracks in a weld seam produced in a process zone, as well as an image of the weld seam actually produced in the process zone, in a top view.

FIG. 7 shows, in a further diagram 50, the intensity of the radiation emitted by the process zone 200 over time. In this regard, essentially defect-free regions 500 can be seen, which have an essentially consistent intensity of the respective intensity fluctuations and an essentially consistent frequency of the individual intensity fluctuations. These essentially defect-free regions 500 correspond with the intensity progression, shown for example in the diagram 50 of FIG. 6, during the production of a particularly uniform, high-quality weld seam 210.

Furthermore, however, the diagram 50 of FIG. 7 also shows aberrations in the intensity progression, wherein the aberrations can be recognized, for example, by the positions 510. If these aberrations 510 are now correlated with their local position within the extension of the weld seam 210 in the image 52, it is visible that in the regions, in which there are greater intensity fluctuations and, accordingly, aberrations 510, there is also an error in the weld seam 210. The detection of the aberrations in the intensity progression is thus indicative of the presence of an error in the weld seam 210.

For an automated monitoring of the welding process and a monitoring of the quality of the weld seam 210 based on the radiation emitted by the process zone 200, it is thus clear that aberrations and/or particularly strong intensity fluctuations, which, for example, strongly exceed a mean value of the detected mean intensity fluctuations, may indicate that at these points in time and/or at these positions, an error is present or occurs in the weld seam 210.

The error may also be present in regions of the workpiece 110, 120 immediately adjacent to the weld seam 210, which regions influence the intensity of the radiation emitted by the process zone 200, for example in the form of a crack present in the direct surroundings of the weld seam 210.

Figure 8:
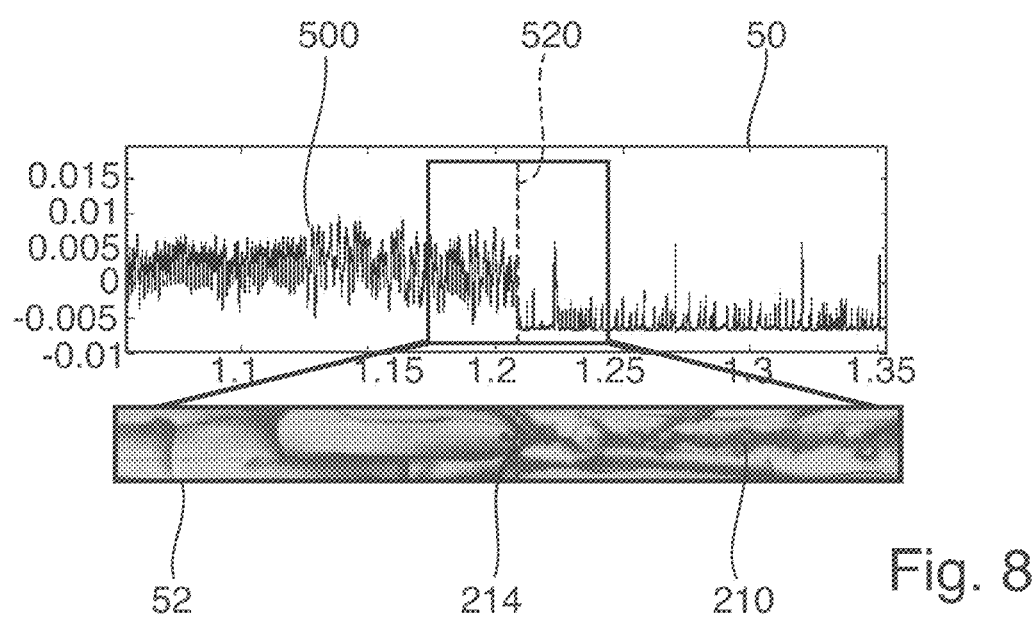
FIG. 8 is a diagram of an example of a time progression of the intensity of radiation emitted from the process zone upon occurrence of an interruption of the weld seam produced in the process zone and an image of the weld seam actually produced in the process zone, in a top view.

FIG. 8 shows, in a further diagram 50, an intensity progression of the radiation emitted by the process zone 200. Here, a defect of a weld seam 210 can be recognized to the effect that, based on an essentially uniform intensity progression in the region 500, a sudden drop of the intensity progression occurs at the position 520. A corresponding examination of the image 52 of the weld seam 210 shows that an interruption of the weld seam 214 is present at the position 520.

For an automated evaluation, a significant change of the intensity level and/or the signal follows, beginning with, for example, a mean value of the intact regions 500 through to the sudden drop of the intensity at the position 520.

For performing a method for monitoring the welding process, it is accordingly possible to extrapolate the presence of a correctly performed weld seam and/or the presence of errors, and/or cracks, and/or interruptions of weld seams from the evaluation of the radiation emitted by the process zone over time and particularly from the evaluation of the intensity of said radiation emitted by the process zone 200.

In certain embodiments, these errors, and/or cracks, and/or interruptions of weld seams detected by means of such a detection of the radiation emitted by the process zone 200 can be communicated to the respective user and/or upon exceedance of a corresponding tolerance threshold, the welding process can be terminated and/or the produced workpiece can be marked as waste material and/or be discharged.

The precise knowledge of the relative position of the process zone 200 within the workpiece 110 due to the relative positioning between workpiece and processing objective 2 allows a precise localization of the errors, and/or cracks, and/or interruptions of weld seams with respect to the workpiece 110 because of the detection, in a time-resolved manner, of the radiation emitted by the process zone 200.

Due to the possibility to localize errors, and/or cracks, and/or interruptions of weld seams, a tracking or regulation of process parameters can be carried out. For example, the power of the processing beam 20 or the feed rate can be adapted. If, for example, an excessive occurrence of cracks in the workpieces 110, 120 is detected, the power of the processing beam 20 can be reduced or the feed rate can be increased accordingly, to reduce the formation of cracks due to tensions created by the introduced temperature gradient.

An evaluation of, for example, the intensity progression of the radiation detected by means of the photodiodes 36 and/or 46 can, for example, be carried out by first preparing the detected signals.

For example, a filtering of the signals can be carried out and/or a noise reduction can be carried out and/or a smoothing of the signals can be carried out and/or special features of the signals can be highlighted etc.

After preparing the signal, an evaluation of the signal can be carried out. For this purpose, for example, a temporal integration of the signal over a predefined period of time can be performed and subsequently, the obtained value can be compared with a target value.

It is also possible to perform an arithmetic averaging of the signal and then, the presence of an intensity fluctuation significantly deviating from the mean value can be indicative of the presence of an error and/or crack. A sudden drop of the signal with respect to the mean value may also be indicative of the presence of an interruption of seam. The mean value may also be calculated as a moving average.

Moreover, an evaluation of the signal can be performed by observing the signal over time. In addition, an evaluation can be performed to the effect that signal maxima and signal minima are observed over a certain period of time, in order to detect, for example, the presence and/or the occurrence of cracks, and/or errors, and/or interruptions of seams.

In other embodiments, for example, a fast Fourier transformation (FFT) can be performed to detect, for a certain period of time, changes of the frequency progression and/or a change of the frequency spectrum of the intensity fluctuations.

In some embodiments, an automated error output can be provided upon exceedance of predefined tolerance limits to accordingly terminate a welding process if there is a high probability of producing waste material by means of the processing operation.

Moreover, countermeasures for stabilizing the processing operation can be provided to accordingly adapt the process parameters automatically, such that the occurrence or change of cracks and/or errors and/or interruptions of seams is reduced.

If applicable, all individual features, which are represented in the exemplary embodiments, can be combined with and/or exchanged for one another, without leaving the scope of the disclosure.

LIST OF REFERENCE NUMBERS

1 Device for monitoring a welding process
100 Border surface
110 (Upper) workpiece
112 Upper surface of the upper workpiece 114 Lower surface of the upper workpiece
120 (Lower) workpiece
122 Upper surface of the lower workpiece
124 Lower surface of the lower workpiece
2 Processing objective
20 Processing beam
200 Process zone
210 Weld seam
212 Bubble-like region
214 Interruption of weld seam
30 Beam splitter
32 Optical filter
34 Focusing lens
36 Photo diode
42 Filter
44 Imaging system
46 Photodiode
48 Lens
50 Diagram of the intensity progression
52 Image
500 Defect-free region
510 Defects
520 Drop of the intensity
X Displacement direction

What is claimed is:

1. An automated method for monitoring a welding process for welding at least one glass workpiece to a further workpiece, the method comprising
    forming a weld seam in the workpieces in a process zone that is exposed to an ultra-short-pulse laser processing beam, wherein the weld seam is formed by a periodic formation of bubble-like regions of a plasma in the workpiece;
    detecting radiation emitted by the process zone in a time-resolved manner,
        wherein the emitted radiation exhibits intensity fluctuations caused by the periodic expansion and collapse of the bubble-like regions of plasma in the glass workpiece, and
        wherein the intensity fluctuations are independent of the pulse frequency of the laser processing beam;
    determining a quality of the weld seam based on one or more of a periodicity, a frequency, or a frequency spectrum of the intensity fluctuations of the detected radiation, wherein detection of a change in the periodicity, frequency, or frequency spectrum of the intensity fluctuations is indicative of an error in the weld seam; and
    providing an error output or a termination of the welding operation, or both, when the quality of the weld seam fails to meet predefined tolerance limits.

2. The method of claim 1, wherein the intensity of the radiation emitted by the process zone is detected.

3. The method of claim 1, wherein the radiation emitted by the process zone is detected and captured by a sensor, and further comprising converting the captured radiation into a signal and preparing the signal for a subsequent evaluation.

4. The method of claim 3, wherein the sensor comprises a photodiode.

5. The method of claim 3, wherein the signal is evaluated in terms of one or more of a presence, formation, or a change of one or more of cracks, interruptions of seams, or errors in the weld seam.

6. The method of claim 3, wherein the signal is prepared by one or more of a filtering, a noise reduction, or a smoothing.

7. The method of claim 3, further comprising screening the radiation emitted by the process zone for a frequency of intensity fluctuations that is different from the pulse frequency of the processing beam.

8. The method of claim 3, wherein two glass workpieces are welded together.

9. A device for monitoring a welding process for welding at least one glass workpiece to a further workpiece, the device comprising
    a processing objective arranged to expose a process zone within at least one of the workpieces, or between the two workpieces, to an ultra-short-pulse laser processing beam to form a weld seam, wherein the weld seam is formed by a periodic formation of bubble-like regions of a plasma in the workpiece;
    a sensor arranged and configured for time-resolved detection of radiation emitted by the process zone, wherein the sensor converts the radiation into a signal that is evaluated for one or more of a periodicity, a frequency, or a frequency spectrum of intensity fluctuations of the emitted radiation,
        wherein the emitted radiation exhibits intensity fluctuations caused by the periodic expansion and collapse of the bubble-like regions of plasma in the workpiece, and
        wherein the intensity fluctuations are independent of the pulse frequency of the laser processing beam; and
    an imaging system arranged to capture radiation emitted by the process zone and to image the radiation onto the sensor,
    wherein the device is configured to determine a quality of the weld seam based on one or more of a periodicity, a frequency, or a frequency spectrum of the intensity fluctuations of the detected radiation, wherein detection of a change in the periodicity, frequency, or frequency spectrum of the intensity fluctuations is indicative of an error in the weld seam; and to
    provide an error output or a termination of the welding operation, or both, when the quality of the weld seam fails to meet predefined tolerance limits.

10. The device of claim 9, wherein the sensor comprises a first sensor exposed with the processing objective, and a second sensor exposed with the imaging system.

11. The device of claim 10, further comprising one or more of a beam splitter, an optical filter, or a focusing lens interposed between the first and second sensors.

12. The device of claim 9, wherein the processing objective is configured and arranged to focus the processing beam into the process zone located in the glass volume formed by the at least one workpiece.

* * * * *